United States Patent
Curtis

(10) Patent No.: US 9,722,408 B2
(45) Date of Patent: Aug. 1, 2017

(54) ARC-FREE CAPACITOR TRIP DEVICE

(71) Applicant: Intermountain Electronics, Inc., Price, UT (US)

(72) Inventor: Dale Curtis, Castle Dale, UT (US)

(73) Assignee: INTERMOUNTAIN ELECTRONICS, INC., Price, UT (US)

( * ) Notice: Subject to any disclaimer, the term of this patent is extended or adjusted under 35 U.S.C. 154(b) by 383 days.

(21) Appl. No.: 14/657,709

(22) Filed: Mar. 13, 2015

(65) Prior Publication Data
US 2015/0326004 A1 Nov. 12, 2015

Related U.S. Application Data

(60) Provisional application No. 61/990,959, filed on May 9, 2014.

(51) Int. Cl.
*H02H 3/16* (2006.01)
*H02H 1/06* (2006.01)

(52) U.S. Cl.
CPC ............. *H02H 1/06* (2013.01); *H02H 3/162* (2013.01)

(58) Field of Classification Search
CPC .................................. H02H 1/06; H02H 3/162
USPC .......................................................... 361/47
See application file for complete search history.

(56) References Cited

U.S. PATENT DOCUMENTS

| | | | |
|---|---|---|---|
| 3,878,436 A * | 4/1975 | Bogel ...................... | H02H 1/06 323/231 |
| 3,995,200 A | 11/1976 | Stolarczyk | |
| 4,415,850 A | 11/1983 | Sherwood | |
| 4,638,244 A | 1/1987 | Howell | |
| 5,576,920 A | 11/1996 | Kosuga | |
| 5,644,461 A | 7/1997 | Miller | |
| 8,149,552 B1 | 4/2012 | Cordill | |
| 2007/0159750 A1 | 7/2007 | Peker et al. | |
| 2008/0048624 A1 * | 2/2008 | Davison ................... | H02H 1/06 320/166 |

OTHER PUBLICATIONS

Line Power, Groundkeeper 145 Continuity Type Ground Monitor, http://linepower.com/literature/pdf/LPMS-GK145, 1993.

(Continued)

*Primary Examiner* — Thienvu Tran
*Assistant Examiner* — Kevin J Comber
(74) *Attorney, Agent, or Firm* — Kunzler Law Group

(57) ABSTRACT

An apparatus includes an energy storage module that receives power from an AC power source. The energy storage module is sized to store electrical energy received from the AC power source that is sufficient to open one or more contacts when the AC power source is not present. The contacts disconnect electrical power to a load and the electrical energy is stored in a DC energy storage device. A connection module connects the energy storage device in series with a trip contact, a trip circuit, and an auxiliary contact. The trip contact closes in response to a trip signal. The trip circuit disconnects the one or more contacts in response to being energized, and the auxiliary contact opens in response to opening of the one or more contacts and disconnects power to the trip circuit. A disconnect module periodically disconnects electrical power from the trip circuit and the auxiliary contact.

21 Claims, 5 Drawing Sheets

(56) References Cited

OTHER PUBLICATIONS

Service Machine, SMC C54-004 and C54-005 Series Ground Monitors, Publication Date: Feb. 2, 1993.
U.S. Appl. No. 13/907,019 Office Action, mailed Jan. 2, 2015.
U.S. Appl. No. 13/907,057 Office Action, mailed Feb. 6, 2015.

* cited by examiner

ARC-FREE CAPACITOR TRIP DEVICE

CROSS-REFERENCES TO RELATED APPLICATIONS

This application claims the benefit of U.S. Provisional Patent Application No. 61/990,959 entitled "ARC-FREE CAPACITOR TRIP DEVICE" and filed on May 9, 2014 for Dale Curtis, which is incorporated herein by reference.

FIELD

This invention relates to power contacts and more particularly relates to opening power contacts when an arc is present.

BACKGROUND

Circuit breakers, protective relays, motor contactors, disconnects and other devices that disconnect power from a load often include one or more contacts. Typically the contacts are mechanical contacts that open and close. When open, the contacts have a space in between the contacts sufficient to prevent current flow through the contacts. A common method of disconnecting power is to include a trip circuit that opens the contacts. Often the trip circuit includes windings and uses an electromagnetic force to open the contacts.

Often a set of contacts that disconnect power to a load includes an auxiliary contact that opens in response to the contacts being open. The auxiliary contact may be used to disconnect auxiliary power that energizes a circuit to open the set of contacts. The auxiliary contact may not be rated to handle a sustained current and may be damaged if current flows through the contact for an extended time period or may open and have an arc across the contacts of the auxiliary contact, which may damage the auxiliary contact.

SUMMARY

An apparatus for disconnecting power to an auxiliary contact is disclosed. A system and method also perform the functions of the apparatus. The apparatus includes an energy storage module that receives power from an alternating current ("AC") power source when the AC power source is present. The energy storage module is sized to store electrical energy received from the AC power source that is sufficient to open one or more contacts when the AC power source is not present. The one or more contacts disconnect electrical power to a load and the electrical energy is stored in a direct current ("DC") energy storage device. The apparatus, in one embodiment, includes a connection module that connects the energy storage device in series with a trip contact, a trip circuit, and an auxiliary contact. The trip contact closes in response to a trip signal. The trip circuit disconnects the one or more contacts in response to being energized, and the auxiliary contact opens in response to opening of the one or more contacts and disconnects power to the trip circuit. The apparatus, in one embodiment, includes a disconnect module that periodically disconnects electrical power from the trip circuit and the auxiliary contact.

In one embodiment, the disconnect module disconnects power from the energy storage device and/or power from the AC power source. In another embodiment, the disconnect module includes at least one switch, where the at least one switch is positioned in series with the trip circuit and auxiliary contact where opening the at least one switch disconnects power from the trip circuit and auxiliary contact. In another embodiment, the disconnect module also includes two switches connected in parallel where the disconnect module continues to operate when one of the two switches fails in an open position. In another embodiment, the at least one switch includes a semiconductor switch.

In one example, the energy storage device includes one or more capacitors. The one or more capacitors are sized with an energy capacity sufficient to energize the trip circuit to open the one or more contacts when power from the AC power source is not present. In another example, the energy storage device includes two or more redundant energy storage devices and when an energy storage device is unavailable, one or more functioning energy storage devices are sized with an energy capacity sufficient to energize the trip circuit to open the one or more contacts when power from the AC power source is not present. In another example, the auxiliary contact has a rating that is for AC operation and/or for momentary operation.

In one embodiment, the apparatus includes a flyback module connected in parallel with the trip circuit, where the flyback module allows current flowing in the trip circuit to flow through the flyback module when the disconnect module disconnects power from the trip circuit and auxiliary contact. In a further embodiment, the flyback module includes a diode oriented to resist current when the disconnect module connects power to the trip circuit and to allow current flowing through the trip circuit to continue flowing in the same direction after the disconnect module disconnects power from the trip circuit as the current in the trip circuit was flowing just prior to the disconnect module disconnecting power from the trip circuit.

In one embodiment, the energy storage module includes a rectification module that rectifies power from the AC power source to provide a voltage with a DC component to the energy storage device. In a further embodiment, the rectifier module includes a half-wave rectifier or a full-wave rectifier. In another embodiment, the disconnect module periodically disconnects power from the trip circuit and auxiliary contact at a fixed frequency with a duty cycle with an on time and an off time, where the on time includes a time when the disconnect module connects power to the trip circuit and auxiliary contact and the off time includes a time when the disconnect module disconnects power from the trip circuit and auxiliary contact. In another embodiment, the duty cycle is in a range between about 60 percent and 95 percent. In a further embodiment, the duty cycle is about 75 percent. In another embodiment, the off time is sufficient to allow the auxiliary contact to open and to extinguish any arc that exists in the auxiliary contact.

In one embodiment, the trip circuit includes a solenoid, an electronic circuit with a solenoid, or a mechanical actuator that opens the one or more contacts and the auxiliary contact when the coil is energized. In another embodiment, the trip circuit and the one or more contacts include a circuit breaker, a protective relay, an overcurrent protection device, a relay, and/or a motor contactor.

A system for disconnecting power to an auxiliary contact includes one or more contacts, a trip circuit that disconnects the one or more contacts from a load in response to being energized, a trip contact, an auxiliary contact, where the trip circuit, the trip contact, and the auxiliary contact are wired in series, an energy storage module, a connection module, and a disconnect module. The energy storage module receives power from an alternating current ("AC") power source when the AC power source is present, and the energy storage module is sized to store electrical energy received from the AC power source that is sufficient to open the one or more contacts when the AC power source is not present. The electrical energy is stored in a direct current ("DC") energy storage device. The connection module connects the energy storage device in series with the trip contact, the trip circuit, and the auxiliary contact. The trip contact closes in response to a trip signal and the auxiliary contact opens in response to opening of the one or more contacts and disconnects power to the trip circuit. The disconnect module periodically disconnects electrical power from the trip circuit and the auxiliary contact.

In one embodiment, the system includes a power source including the one or more contacts, the trip circuit, the auxiliary contact, the energy storage module, the connection module and/or the disconnect module. In another embodiment, the system includes a distribution panel with the one or more contacts, the trip circuit, the auxiliary contact, the energy storage module, the connection module and/the disconnect module. In another embodiment, the system includes a load including the one or more contacts, the trip circuit, the auxiliary contact, the energy storage module, the connection module and the disconnect module.

A method for disconnecting power to an auxiliary contact includes receiving power, with an energy storage module, from an alternating current ("AC") power source when the AC power source is present, where the energy storage module is sized to store electrical energy received from the AC power source that is sufficient to open one or more contacts when the AC power source is not present. The one or more contacts disconnect electrical power to a load, using the electrical energy stored in a direct current ("DC") energy storage device to do so. The method includes, in one embodiment, connecting the energy storage device in series with a trip contact, a trip circuit, and an auxiliary contact, where the trip contact closes in response to a trip signal, and the trip circuit disconnects the one or more contacts in response to being energized, and the auxiliary contact opens in response to opening of the one or more contacts and disconnects power to the trip circuit. The method, in one embodiment, includes periodically disconnecting electrical power from the trip circuit and the auxiliary contact.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
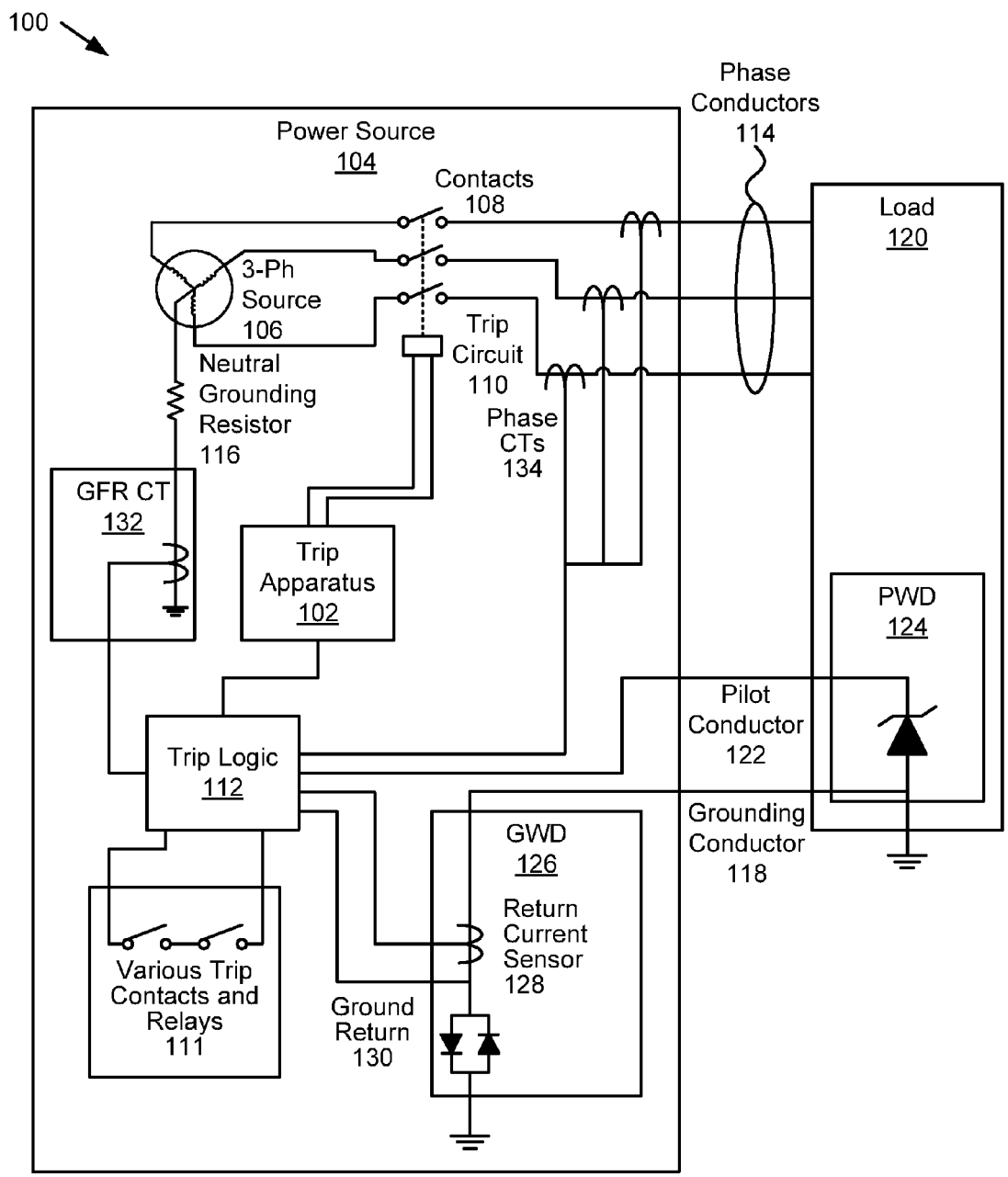
FIG. 1 is a schematic block diagram of one embodiment of a system for opening a contact in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, a storage device comprising an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 is a schematic block diagram of one embodiment of a system 100 for opening a contact in accordance with one embodiment of the present invention. The system 100 includes a trip apparatus 102 in a power source 104 with a three-phase power source 106, a contact 108 with a trip circuit 110, various trip contacts and relays 111, trip logic 112, phase conductors 114, a neutral grounding resistor 116, a grounding conductor 118, a load 120, a pilot conductor 122, a PWD 124, a GWD 126, a return current sensor 128, a ground return 130, a ground fault relay current transformer 132, and phase current transformers 134, which are described below.

The system 100 is a simplified electrical power system. For example, the power system may be part of a building electrical power system and the power source 104 may be service entrance switchgear. In another example, the power source 104 may provide 208 volts ("V"), 230 V, 415 V, 480 V, 600 V, or other standard building voltage in the United States or other country. In another embodiment, the system 100 is for a mining application and the power source 104, load 120, and conductors 114, 118, 122 may be portable. For example, the conductors 114, 118, 122 may be together in flexible insulated covering. In another embodiment, the system 100 may be part of an electric utility distribution system and the power source 104 may provide low, medium, or high voltage. In another embodiment, the system 100 is part of a self-contained electrical system, such as a power system for a vehicle, a vessel, a computer system, a satellite, etc. One of skill in the art will recognize other types of electrical power systems where the trip apparatus 102 is useful.

The system 100 includes a trip apparatus 102 within a power source 104 that includes a three-phase power source 106. In other embodiments, the trip apparatus 102 is external to the power source 104. For example, the trip apparatus 102 may be associated with an overcurrent protection device that is part of a load 120 or within a power distribution system and may include various trip contacts and relays 111 and the trip logic 112. The trip apparatus 102 opens one or more contacts 108 (or "contacts 108") to disconnect a power source, such as the three-phase power source 106 of the system 100 of FIG. 1, from a load 120.

The system 100 includes trip logic 112 that generates a trip signal in response to detecting a condition where opening the contacts 108 is desired, for example in response to a trip contact or relay 111 closing. The trip logic may use current in the phase conductors 114, voltage measurements, current from the ground fault relay current transformer 132, current from the return current sensor 128, etc. determine that the contacts 108 should open and may generate a trip signal. The trip logic 112 may include logic to send a trip signal after reaching a threshold. The logic may or may not include a time component. For example, the trip logic 112 may include an inverse-time characteristic where the trip signal is sent sooner for higher current and slower for lower current. The trip logic 112 may also include a threshold. For example, the trip logic 112 may send a trip signal when a current reaches a threshold without regard to time. The trip logic 112 may also include power quality trip characteristics where the trip logic 112 sends a trip signal when a power quality parameter is exceeded. In one embodiment, the trip logic 112 is separate from the trip apparatus 102 as shown in FIG. 1. In other embodiments, the trip logic 112 is part of the trip apparatus 102 and sensor readings are fed to the trip apparatus 102. The trip apparatus 102 and trip logic 112 are described in more detail with regard to the apparatuses 200, 300, 400 of FIGS. 2-4.

The power source 104 is depicted with a three-phase power source 106, but in other embodiments, the power source 104 may include a single phase power source or some other type of alternating current ("AC") power source. In one embodiment, the power source 104 is a connection to a utility power grid and may include a service entrance connection, may include a panel or switchgear downstream of a service entrance, etc. In another embodiment, the power source 104 includes a generator. In other embodiments, the power source 104 may include an inverter, an uninterruptable power supply, a fuel cell, or other source of AC power and may include a combination of power sources. One of skill in the art will recognize other AC power sources that may be used with the trip apparatus 102.

In one embodiment, the system 100 includes one or more contacts 108 that connect and disconnect the power source 104 from the load 120. For example, the contacts 108 may be part of an overcurrent protection device, such as a circuit breaker, switch, protective relay, motor contactor, etc. In the embodiment depicted in FIG. 1, the contacts 108 are shown in the power source 104. In other embodiments, the contacts 108 may be within a power distribution system, may be part of a load 120, etc. The contact 108 may be part of any device that disconnects a power source 104 from a load 120. Where the contacts 108 are associated with a device other than the power source 104, the trip logic 112 and trip apparatus 102 may be located with the contacts 108 or may be located external to the power source 104.

In the depicted embodiment, the contacts 108 include a set of three contacts that disconnect three phase conductors 114 from the three-phase power source 106. In other embodiments, the contacts 108 include a single contact for disconnecting a single conductor. In a further embodiment, the system 100 may include multiple contacts 108 that act together or separately. In the depicted embodiment, a coil of the contact 108 is located near the contacts 108, for example as part of the trip circuit 110. The coil of the contacts 108, which is often a coil of a solenoid, is typically a device that operates the contacts 108 to an open or a closed position. In addition, the coil is typically part of the trip circuit 110. For example, the trip circuit 110 may include the coil along with conductors, a snubber, a zener diode, or other circuitry typically included with one or more contacts 108. In other embodiments, the trip circuit 110 may include elements remote from the contacts 108, for example in the trip apparatus 102, at a substation, in a load 120, etc. The trip apparatus 102 controls power to the coil through the trip circuit and the coil operates the contacts 108.

The system 100 includes three phase conductors 114, but other systems may include a neutral (not shown). In addition, each phase may include multiple conductors in parallel. In the depicted system 100, a grounding conductor 118 is also included. Typically the grounding conductor 118 is a safety ground and is configured as a conductor run with the phase conductors 114 and/or neutral (not shown), for example, in conduit or as a cable assembly, and may be identified with a green marking. In another example, the system 100 does not include a grounding conductor 118 and may rely on conduit or another conductive path for current flow in a short circuit condition.

In one embodiment, the system 100 includes a neutral grounding resistor 116 between a neutral connection of the power source 104 and a ground reference point, for example as part of the neutral to ground bond. The grounding conductor 118, in one embodiment, connects to ground reference point. For example, the ground reference point may be earth ground, a bond to a building structure, a bond to a vehicle or vessel structure, etc. The neutral grounding resistor 116, in one embodiment, is sized to limit fault current, and is common in mining power systems. In other embodiments, the system does not include a neutral grounding resistor 116 and the neutral connects directly to the ground reference point.

The system 100, in one embodiment, includes a load 120 connected to the power source 104. The load 120 may include a single load or multiple loads. The load 120, in one embodiment includes equipment that consumes electrical power, such as a motor. In another embodiment, the load 120 includes a distribution panel, and may include circuit breakers, fuses, etc. In another embodiment, the load 120 is a motor controller, such as a variable frequency drive. In one embodiment, the load 120 is a piece of mining equipment. One of skill in the art will recognize other loads 120.

In one embodiment, the system 100 includes a ground monitor system for determining if the grounding conductor 118 is properly connected, has an impedance that is higher than desired, or has current running through the grounding conductor 118 that is above a desired limit. The ground monitoring system may include a ground monitor (not shown), a pilot conductor 122, a pilot wire diode ("PWD") 124, a ground wire device ("GWD") 126, a return current sensor 128, and other components typical in a ground monitor system. The ground monitor system may be compliant with current requirements of the Mine Safety and Health Administration ("MSHA").

The ground monitor may send a signal via the pilot conductor 122 and through the PWD 124. The signal may return through the grounding conductor 118 and the return current sensor 128 may sense the signal and other current. Characteristics of the signal may be monitored by the ground monitor to determine abnormal conditions. The GWD 126 may provide isolation from other ground monitor systems and may service to limit current. In another embodiment, the ground monitor system does not include a pilot conductor 122 and may send a signal through the phase conductors 114. One example of a ground monitor is discussed in more detail in U.S. patent application Ser. No. 13/906,807 entitled "GROUND MONITOR CURRENT SENSING" and filed on May 31, 2013 for Dale Curtis, et al., which is incorporated herein by reference.

In one embodiment, the system 100 includes a ground fault relay current transformer ("GFR CT") 132 that may be used in conjunction with a ground fault current module (not shown) that determines a current in a connection between a ground of the power source 104 and a chassis ground of the power source 104. For example, the power source 104 may include a connection to chassis ground and the ground fault current module may determine current in the connection. The ground fault current module may monitor current through the neutral grounding resistor 116 or in conductors between a ground of the power source 104 and a chassis ground. In one embodiment, the chassis ground is also an earth ground. In one embodiment, the ground fault current module measures current by measuring voltage across the neutral grounding resistor 116. In another embodiment, the ground fault current module measures current using a current transformer, such as the GFR CT 132 depicted in FIG. 1. In another embodiment, the ground fault current module includes other circuitry to provide a signal useful for sending a trip signal from the trip logic 112, such as a voltage proportional to current in the connection between the ground of the power source 104 and the chassis ground.

In one embodiment, the system 100 includes one or more phase current transformers ("CTs") 134 configured to measure current in each phase conductor 114. The phase CTs 134 are typically sized based on rated current and more or less phase CTs 134 may be included depending on the configuration of the power source 104. The phase CTs 134 may be used to file detect fault current or other current abnormality. In addition, the system 100 may include other sensors (not shown), such as voltage sensors, neutral current CTs, etc. configured to enable detection of normal or abnormal conditions where the trip apparatus 102 may be used to disconnect power from the power source 104 to the load 120. One of skill in the art will recognize other current and voltage sensors for detecting conditions within the system 100.

Figure 2:
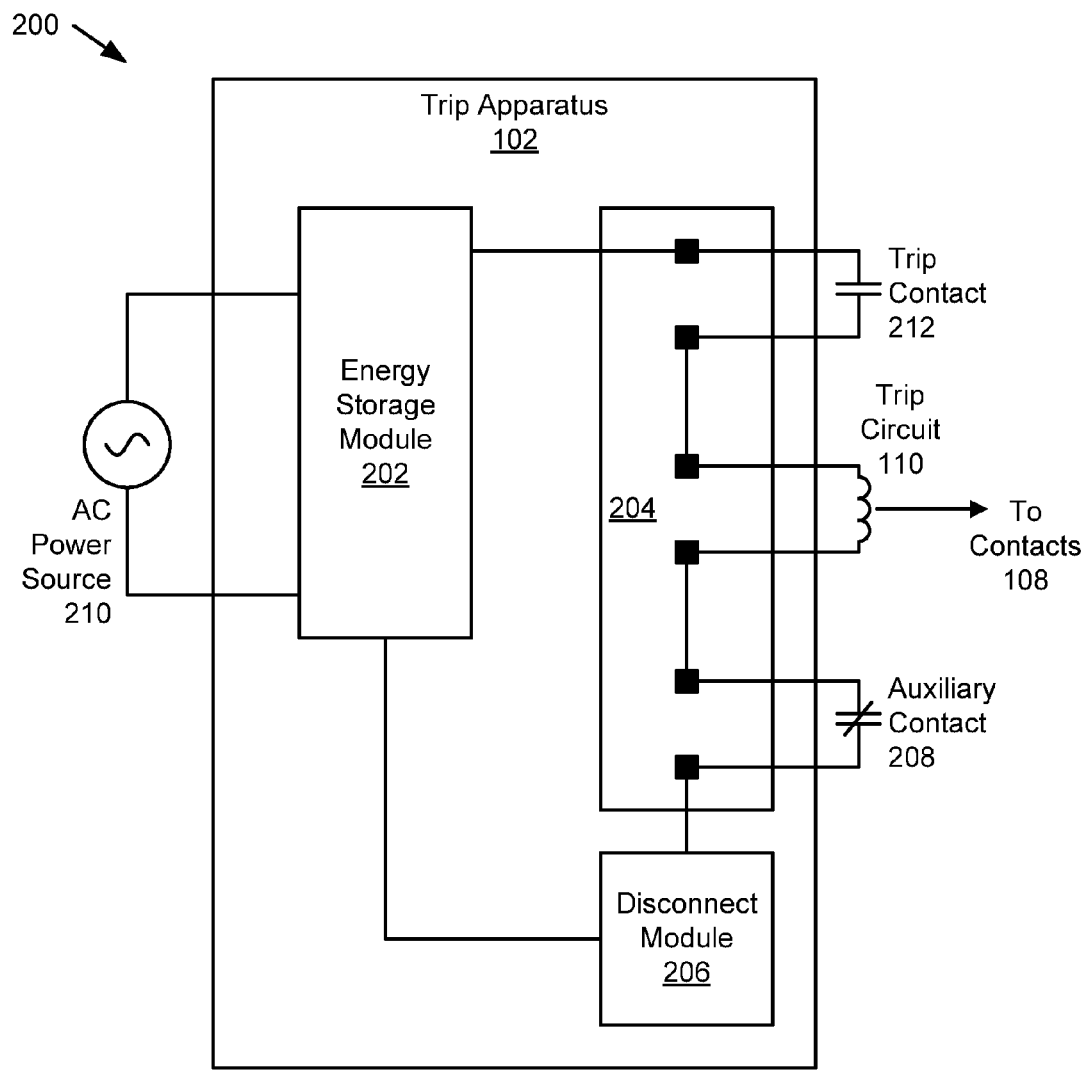
FIG. 2 is a schematic block diagram of one embodiment of an apparatus for opening a contact in accordance with one embodiment of the present invention.

FIG. 2 is a schematic block diagram of one embodiment of an apparatus 200 for opening a contact in accordance with one embodiment of the present invention. The apparatus 200 includes one embodiment of the trip apparatus 102 with an energy storage module 202, a connection module 204, and a disconnect module 206, a trip circuit 110, an AC power source 210, a trip contact 212, and an auxiliary contact 208, which are described below.

The trip apparatus 102 is configured to include energy storage to provide power for opening the contact 108 when the AC power source 210 is not present or not capable of providing AC power to trip apparatus 102. In one embodiment, the energy storage module 202 receives power from the AC power source 210 and stores energy from the AC power source 210 in a form that has a direct current ("DC") voltage available for providing power to the trip circuit 110. Where the auxiliary contact 208 is an AC-rated contact that is rated for AC power or is rated for momentary operation, providing a DC voltage for an extended time period may cause damage to the auxiliary contact 208 when the auxiliary contact 208 opens. An AC-rated contact is typically a contact that is rated for operation where an AC current is applied and not for when a DC current is applied.

A momentary-rated contact is typically a contact that is rated for momentary operation where power may be applied momentarily and application of voltage for a period of time longer than a momentary time rating may damage the contact. For example, the trip circuit 110 may include a solenoid that is rated for momentary operation or AC operation and applying a DC voltage may damage the trip circuit 110 and/or solenoid if the DC voltage is not interrupted before damage occurs. While an auxilary contact 208 may be provided that is rated for DC operation, the trip apparatus 102 provides a mechanism so that a less expensive AC-rated or momentary-rated auxiliary contact 208 may be used.

The apparatus 200 includes an energy storage module 202 with an energy storage device, in one embodiment, that stores electrical energy sufficient to open the contact 108 when AC power is not present from the AC power source 210. In one embodiment, the electrical energy is stored in a DC energy storage device. For example, the energy storage device may include one or more capacitors. In another embodiment, the energy storage device may include one or more batteries, potential mechanical energy storage, chemical energy storage, or other elements capable of storing electrical energy such that a DC voltage is available from the energy storage device to disconnect the power source 104 from the load 120. Typically the energy storage device is capable of supplying energy in a time frame to not impede opening the contacts 108 in case of an overcurrent or other atypical power event.

Typically the energy storage device stores energy received from the AC power source 210. In typical operation the AC power source 210 may provide energy, through the energy storage module 202 to open the contacts 108. However, in some instances the AC power source 210 may not be present. In some scenarios there may be an increased likelihood that the AC power source 210 is not present when a trip signal is generated by the trip logic 112. For example, if an explosion causes a short circuit condition, the explosion may also damage the AC power source 210.

The energy storage device, in one embodiment, is configured with two or more energy storage elements in parallel where when one energy storage element is not available, the remaining energy storage element(s) is/are sized to have an energy capacity such that when the AC power source 210 is not present, the functioning energy storage elements have electrical energy sufficient to open the contacts 108. For example, if the energy storage element includes capacitors, if one capacitor fails the remaining capacitor(s) include enough electrical energy to open the contacts 108.

In one embodiment, the apparatus 200 includes a connection module 204 that connects the energy storage device in series with the trip contact 212, the trip circuit 110, and the auxiliary contact 208. The trip contact 212 closes in response to a trip signal from the trip logic 112. The trip circuit 110 disconnects the one or more contacts 108 in response to being energized and the auxiliary contact 208 opens in response to opening of the contacts 108 and disconnects power to the trip circuit 110. The connection module 204, in one embodiment, connects the trip contact 212, the trip circuit 110, and the auxiliary contact 208 in series with the energy storage module 202 as shown the embodiment depicted in FIG. 2.

In one embodiment, one or more of the trip contact 212, the trip circuit 110, and the auxiliary contact 208 are external to the trip apparatus 102 as shown in FIG. 2. For example, the trip circuit 110, and the auxiliary contact 208 may be part of an overcurrent protection device or other contactor and the trip contact 212 may be part of the trip logic 112. In one embodiment, the trip logic 112 is part of the overcurrent protection device or contactor. In one embodiment, the auxiliary contact 208 is mechanically coupled to the contacts 108 and opens when the contacts 108 open and closes when the contacts 108 close. In another embodiment, the trip contact 212, the trip circuit 110, and the auxiliary contact 208 are internal to the trip apparatus 102. For example, the trip apparatus 102 may be incorporated into an overcurrent protection device, contactor, etc. that includes the contacts 108. In one embodiment the trip contact 212 includes a mechanical contact. In another embodiment, the trip contact 212 includes a semiconductor switch or other circuit that provides a low impedance path in response to a trip signal. In another embodiment, the trip contact 212 includes both a semiconductor switch and a mechanical contact.

The apparatus 200, in one embodiment, includes a disconnect module 206 that periodically disconnects electrical power from the trip circuit 110 and the auxiliary contact 208. Typically the disconnect module 206 disconnects DC voltage of the energy storage device and/or power from the AC power source 210 from the trip circuit 110 and the auxiliary contact 208. For example, the disconnect module 206 may disconnect DC voltage of the energy storage device and/or power from the AC power source 210 from the trip circuit 110 and the auxiliary contact 208 before damage occurs to the auxiliary contact 208 from the DC voltage. For example, the disconnect module 206 may disconnect DC voltage of the energy storage device from the trip circuit 110 and the auxiliary contact 208 at a rate consistent with a frequency of an AC voltage of the AC power source 210, the power source 104, or within a frequency range within a rating of the auxiliary contact 208. In another embodiment, the disconnect module 206 may disconnect DC voltage of the energy storage device from the trip circuit 110 and the auxiliary contact 208 at a rate consistent with a momentary rating of the auxiliary contact 208.

In one embodiment, the disconnect module 206 includes at least one switch where the switch is positioned in series with the trip circuit 110 and auxiliary contact 208 so that opening the switch disconnects the energy storage device from the trip circuit 110 and auxiliary contact 208. In another embodiment, the disconnect module 206 includes two switches connected in parallel where the disconnect module 206 continues to operate when one of the two switches fails in an open position. The one or more switches may include a semiconductor switch and/or a mechanical switch. In one embodiment, the AC power source 210 may connect to the energy storage device so that all power to the trip circuit 110 and auxiliary contact 208 come through the energy storage module 202. In another embodiment, the AC power source 210 is connected to both the energy storage module 202 and to the trip circuit 110 and auxiliary contact 208. The disconnect module 206 disconnects power to the trip circuit 110 and auxiliary contact 208 for either configuration.

In one embodiment, the disconnect module 206 periodically disconnects power from the trip circuit 110 and auxiliary contact 208 at a fixed frequency with a duty cycle with an on time and an off time. The on time includes a time when the disconnect module 206 connects the energy storage device and/or AC power source 210 to the trip circuit 110 and auxiliary contact 208 and the off time includes a time when the disconnect module 206 disconnects the energy storage device and/or AC power source 210 from the trip circuit 110 and auxiliary contact 208. For example, the disconnect module 206 may include a pulse-width modulation device that operates at a chosen frequency and a chosen duty cycle. In one embodiment, the duty cycle is in a range between about 60 percent and 95 percent. In a specific embodiment, the duty cycle is about 75 percent. For example, the off time may simulate a time when an AC waveform is at or near zero volts. Hereinafter, a duty cycle being "about" a certain value means that the duty cycle can vary from the certain value by a reasonable amount. For example, a duty cycle of about 60% could be in a range from 55% to 65% and one of skill in the art will recognize that setting a duty cycle at a particular value is inexact due to part tolerances, operating conditions, etc.

Typically the off time is set to a period of time to allow the auxiliary contact 208 to open or avoid damage. For example, the off time may be chosen to be sufficient to allow the auxiliary contact 208 to open and to extinguish any arc that exists in the auxiliary contact 208. The frequency and associated on time of the duty cycle, in one embodiment, are set to values that provide enough energy to the trip circuit 110 to open the contacts 108. The on time may be set to open the contacts 108 while providing additional energy for a safety margin. One of skill in the art will recognize how to choose a frequency and duty cycle to allow enough energy to open the contacts 108 while preventing damage to the auxiliary contact 208.

The AC power source 210, in one embodiment, is part of the power source 104. For example, the AC power source 210 may receive power from a phase of the three-phase power source 106. In another embodiment, the AC power source 210 receives power from the power source 104 and includes a transformer, a regulator, or other device to change voltage supplied to the energy storage module 202. In another embodiment, the AC power source 210 receives power from a source other than the power source 104. For example, the AC power source 210 may connect to an auxiliary power source, a control power source, etc. One of skill in the art will recognize other ways to provide an AC power source 210 for opening the contacts 108 and/or for supplying power to the energy storage module 202.

In another embodiment, the apparatus 200 or system 100 includes a DC power source (not shown) to provide power to the energy storage module 202 in lieu of or in addition to the AC power source 210. For example, a DC control voltage may be supplied to the energy storage module 202. The DC control voltage may be from a power supply, a DC control bus, etc.

Figure 3:
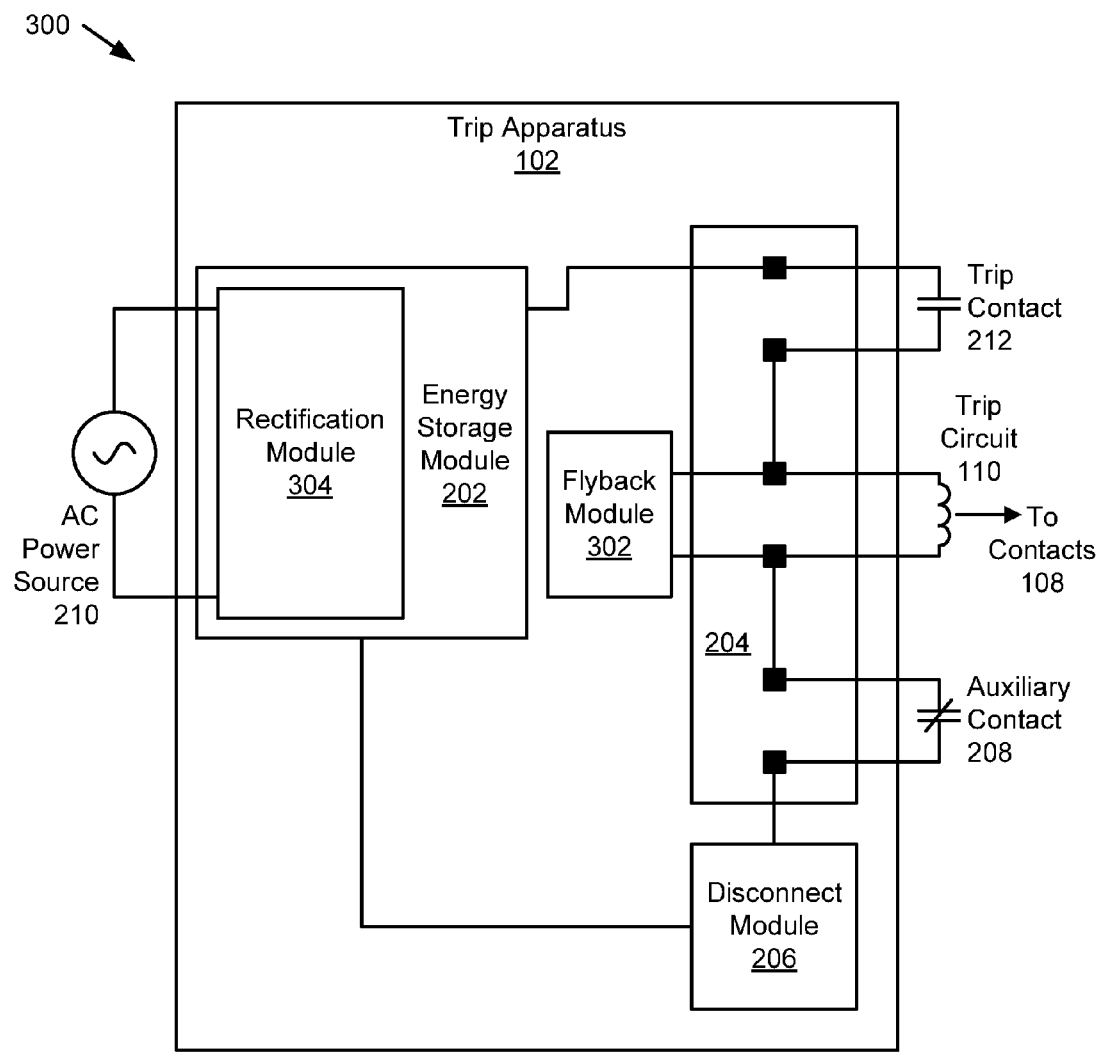
FIG. 3 is a schematic block diagram of a second embodiment of an apparatus for opening a contact in accordance with one embodiment of the present invention.

FIG. 3 is a schematic block diagram of a second embodiment of an apparatus 300 for opening a contact in accordance with one embodiment of the present invention. The apparatus 300 includes another embodiment of the trip apparatus 102 with an energy storage module 202, a connection module 204, and a disconnect module 206, a trip circuit 110, an AC power source 210, a trip contact 212, and an auxiliary contact 208, which are substantially similar to those describe above in relation to the apparatus 200 of FIG. 2. In addition, the apparatus 300 includes a flyback module 302 and a rectification module 304, which are described below.

In one embodiment, the apparatus 300 includes a flyback module 302 connected in parallel with the trip circuit 110. The flyback module 302 allows current flowing in the trip circuit 110 to flow through the flyback module 302 when the disconnect module 206 disconnects power from the trip circuit 110 and auxiliary contact 208. For example, wiring and other components of the trip apparatus 102 may include inductance and when the disconnect module 206 disconnects power from the trip circuit 110 and auxiliary contact 208, the inductance may resist immediate stopping of current flow. In particular, the trip circuit 110 may include inductance when the trip circuit 110 is a coil operating a solenoid. In some embodiments, without the flyback module 302, the trip circuit 110 may be damaged when the disconnect module 206 disconnects power from the trip circuit 110 and auxiliary contact 208.

In another embodiment, the apparatus 300 includes a rectification module 304 that rectifies power from the AC power source 210 to provide a voltage with a DC component to the energy storage device. For example, the rectification module 304 may include a half-wave rectifier or a full-wave rectifier. In another example, the rectification module 304 includes a low-pass filter or other components to condition power to the energy storage device. In another embodiment, the rectification module 304 includes an AC-to-DC converter or a DC-to-DC converter to convert voltage to DC at a suitable voltage level. One of skill in the art will recognize other elements and components that may be used with the rectification module 304.

Figure 4:
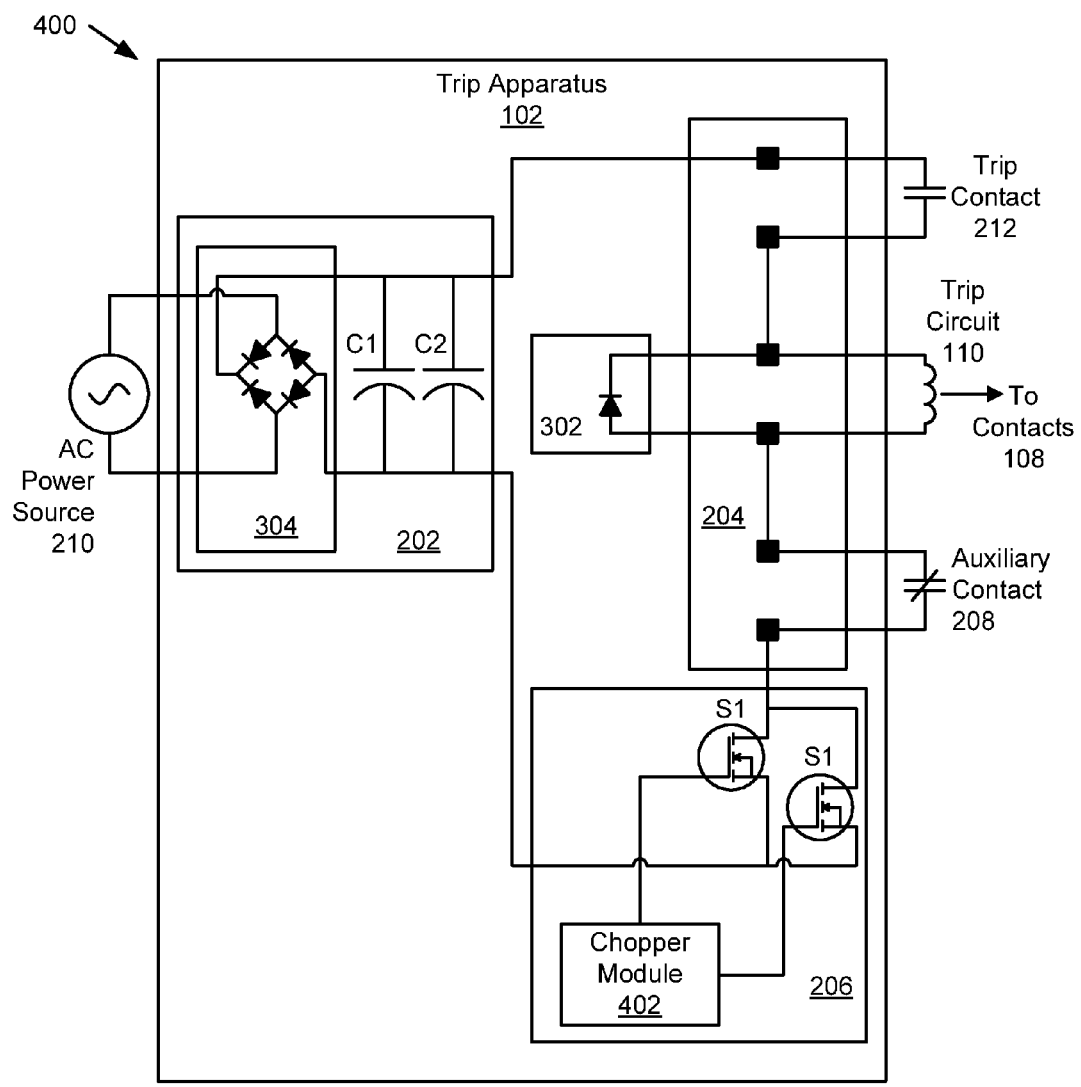
FIG. 4 is a schematic block diagram of a third embodiment of an apparatus for opening a contact in accordance with one embodiment of the present invention.

FIG. 4 is a schematic block diagram of a third embodiment of an apparatus 400 for opening a contact in accordance with one embodiment of the present invention. The apparatus 400 includes another embodiment of the trip apparatus 102 with an energy storage module 202, a connection module 204, and a disconnect module 206, a trip circuit 110, an AC power source 210, a trip contact 212, an auxiliary contact 208, a flyback module 302 and a rectification module 304, which are substantially similar to those describe above in relation to the apparatuses 200, 300 of FIGS. 2 and 3. The apparatus 400 includes specific embodiments of the rectification module 304, the energy storage device, the flyback module 302, and the disconnect module 206. In addition, the apparatus 400 includes a chopper module 402 which is described below. Note that other components may be included in the apparatus 400, such as startup circuits, a capacitor soft start circuit, capacitor discharge circuits, a watchdog circuit, etc., but are not shown for clarity.

In one embodiment, the apparatus 400 includes a full-wave rectifier as shown in the rectification module 304. The rectification module 304 may include other components, such as snubbers, zener diodes, a metal-oxide varistor ("MOV"), a capacitor charge relay circuit, etc. that are not shown. The energy storage module 202 includes two capacitors C1, C2 for energy storage. The capacitors C1, C2 may be sized so that each has capacity sufficient to open the contacts 108. In one embodiment, the flyback module 302 includes a diode oriented to resist current when the disconnect module 206 connects the energy storage device and/or AC power source 210 to the trip circuit 110 and to allow current flowing through the trip circuit 110 to continue flowing in the same direction, after the disconnect module 206 disconnects the energy storage device and/or AC power source 210 from the trip circuit 110, as the current in the trip circuit 110 was flowing just prior to the disconnect module 206 disconnecting power from the trip circuit 110. For example, the diode may be connected as shown in FIG. 4. In another embodiment, two or more diodes may be connected in parallel to provide fault tolerance or for other reasons.

In one embodiment, the disconnect module 206 includes two switches as shown in FIG. 4. Other embodiments may include one switch. For example, the switches may be insulated-gate bi-polar transistors ("IGBTs"), metal-oxide semiconductor field-effect transistors ("MOS-FETs") or other common semiconductor device. In one embodiment, the disconnect module 206 may include a chopper module 402 that drives the switches. The chopper module 402 may include a duty cycle controller, an oscillator, etc. In one embodiment, the chopper module 402 may be included with the trip logic 112 as part of an integrated circuit, which may include a chip, a circuit board, etc. For example, the integrated circuit may include a processor for controlling trip logic and other functions. In one embodiment, the integrated circuit and/or other components of the apparatus 400 may include a watchdog circuit that determines if a component has failed, or if there has been a software crash, and may send a trip signal, or perform some other appropriate action or actions, in response to a component failure, software crash, or other error. One of skill in the art will recognize other components that may be included in the apparatus 400, for example, for safety and reliability. A software crash is an event where a software error of some type interferes with operation of the apparatus 400.

Figure 5:
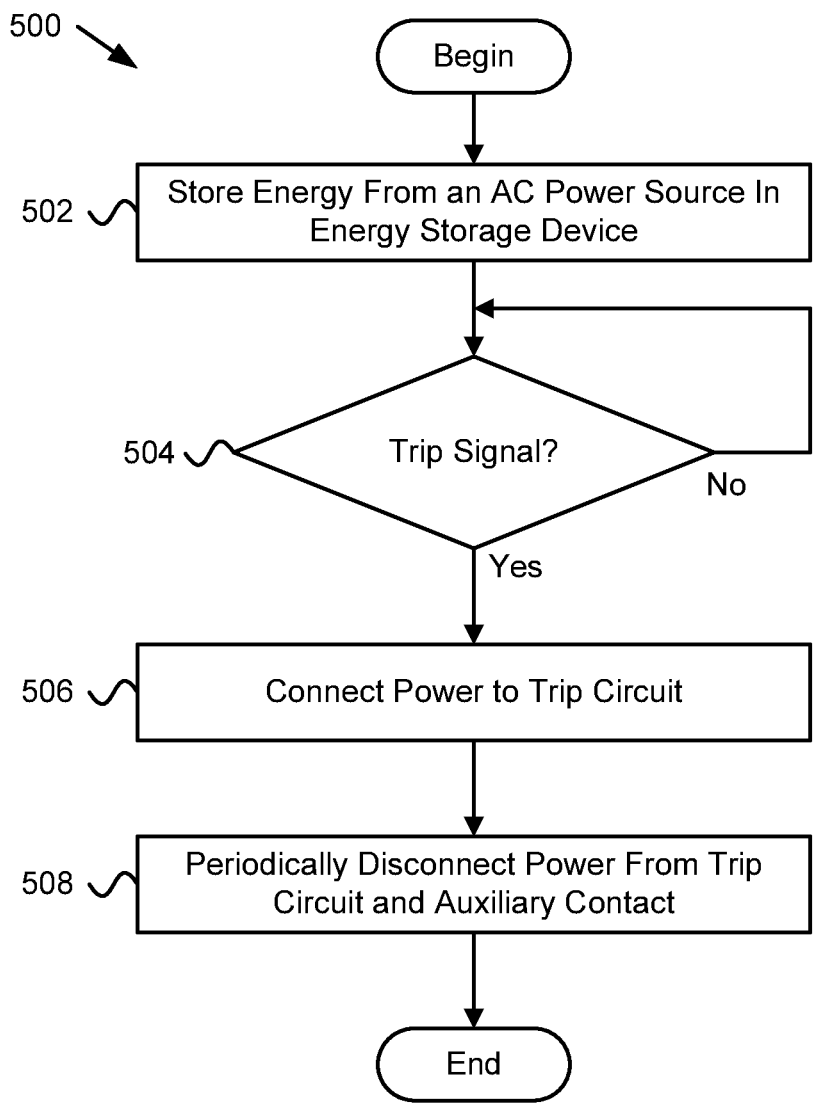
FIG. 5 is a schematic block diagram illustrating one embodiment of a method for opening a contact in accordance with one embodiment of the present invention.

FIG. 5 is a schematic block diagram illustrating one embodiment of a method 500 for opening a contact in accordance with one embodiment of the present invention. The method 500 begins and stores 502 energy from an AC power source 210 in one or more energy storage devices. For example, the energy storage module 202 may store energy in the energy storage device. The method 500 determines 504 if there is a trip signal. For example, the trip logic 112 may send a trip signal based on input from current sensors, voltage sensors, watchdog circuits, etc. If the method 500 determines 504 that there is not a trip signal, the method 500 returns and again determines 504 if there is a trip signal.

If the method 500 determines 504 that there is a trip signal, the method 500 connects power to a trip circuit 110 and energy flows through an auxiliary contact 208. Connecting power to the trip circuit 110 causes the contacts 108 to open eventually. For example, the trip signal may close a trip contact 212 that is connected in series with the energy storage device and/or AC power source 210 and trip circuit 110. Typically the auxiliary contact 208 is also wired in series with the trip contact 212, the energy storage device and trip circuit 110. The method 500 periodically disconnects 508 power from the trip circuit 110 and auxiliary contact 208, and the method 500 ends. Disconnecting 508 power from the auxiliary contact 208 and trip circuit 110 helps to prevent damage to the auxiliary contact 208, and possibly to the trip circuit 110.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. An apparatus comprising:
an energy storage module that receives power from an alternating current ("AC") power source when the AC power source is present, wherein the energy storage module is sized to store electrical energy received from the AC power source that is sufficient to open one or more contacts when the AC power source is not present, the one or more contacts disconnecting electrical power to a load, the electrical energy stored in a direct current ("DC") energy storage device;
a connection module that connects the energy storage device in series with a trip contact, a trip circuit, and an auxiliary contact, the trip contact closes in response to a trip signal, the trip circuit disconnects the one or more contacts in response to being energized, and the auxiliary contact opens in response to opening of the one or more contacts and disconnects power to the trip circuit; and
a disconnect module that periodically disconnects electrical power from the trip circuit and the auxiliary contact.

2. The apparatus of claim 1, wherein the disconnect module disconnects one or more of power from the energy storage device and power from the AC power source.

3. The apparatus of claim 1, wherein the disconnect module further comprises at least one switch, the at least one switch positioned in series with the trip circuit and auxiliary contact wherein opening the at least one switch disconnects power from the trip circuit and auxiliary contact.

4. The apparatus of claim 3, wherein the disconnect module further comprises two switches connected in parallel wherein the disconnect module continues to operate when one of the two switches fails in an open position.

5. The apparatus of claim 3, wherein the at least one switch comprises a semiconductor switch.

6. The apparatus of claim 1, wherein the energy storage device comprises one or more capacitors, the one or more capacitors sized with an energy capacity sufficient to energize the trip circuit to open the one or more contacts when power from the AC power source is not present.

7. The apparatus of claim 1, wherein the energy storage device comprises two or more redundant energy storage devices and wherein when an energy storage device is unavailable, one or more functioning energy storage devices are sized with an energy capacity sufficient to energize the trip circuit to open the one or more contacts when power from the AC power source is not present.

8. The apparatus of claim 1, wherein the auxiliary contact comprises a rating that is one or more of for AC operation and for momentary operation.

9. The apparatus of claim 1, further comprising a flyback module connected in parallel with the trip circuit, wherein the flyback module allows current flowing in the trip circuit to flow through the flyback module when the disconnect module disconnects power from the trip circuit and auxiliary contact.

10. The apparatus of claim 9, wherein the flyback module comprises a diode oriented to resist current when the disconnect module connects power to the trip circuit and to allow current flowing through the trip circuit to continue flowing in the same direction after the disconnect module disconnects power from the trip circuit as the current in the trip circuit was flowing just prior to the disconnect module disconnecting power from the trip circuit.

11. The apparatus of claim 1, wherein the energy storage module further comprises a rectification module that rectifies power from the AC power source to provide a voltage with a DC component to the energy storage device.

12. The apparatus of claim 11, wherein the rectifier module comprises one of a half-wave rectifier and a full-wave rectifier.

13. The apparatus of claim 1, wherein the disconnect module periodically disconnects power from the trip circuit and auxiliary contact at a fixed frequency with a duty cycle with an on time and an off time, wherein the on time comprises a time when the disconnect module connects power to the trip circuit and auxiliary contact and the off time comprises a time when the disconnect module disconnects power from the trip circuit and auxiliary contact.

14. The apparatus of claim 13, wherein the duty cycle is in a range between about 60 percent and 95 percent.

15. The apparatus of claim 14, wherein the duty cycle is about 75 percent.

16. The apparatus of claim 13, wherein the off time is sufficient to allow the auxiliary contact to open and to extinguish any arc that exists in the auxiliary contact.

17. The apparatus of claim 1, wherein the trip circuit comprises one of a solenoid, an electronic circuit with a solenoid, and a mechanical actuator that opens the one or more contacts and the auxiliary contact when the coil is energized.

18. The apparatus of claim 1, wherein the trip circuit and the one or more contacts comprise one or more of a circuit breaker, a protective relay, an overcurrent protection device, a relay, and a motor contactor.

19. A system comprising:
one or more contacts;
a trip circuit that disconnects the one or more contacts from a load in response to being energized;
a trip contact;
an auxiliary contact, wherein the trip circuit, the trip contact, and the auxiliary contact are wired in series;
an energy storage module that receives power from an alternating current ("AC") power source when the AC power source is present, wherein the energy storage module is sized to store electrical energy received from the AC power source that is sufficient to open the one or more contacts when the AC power source is not present, the electrical energy stored in a direct current ("DC") energy storage device;
a connection module that connects the energy storage device in series with the trip contact, the trip circuit, and the auxiliary contact, the trip contact closes in response to a trip signal and the auxiliary contact opens in response to opening of the one or more contacts and disconnects power to the trip circuit; and
a disconnect module that periodically disconnects electrical power from the trip circuit and the auxiliary contact.

20. The system of claim 19, further comprising one or more of:
a power source comprising the one or more contacts, the trip circuit, the auxiliary contact, the energy storage module, the connection module and the disconnect module;
a distribution panel comprising the one or more contacts, the trip circuit, the auxiliary contact, the energy storage module, the connection module and the disconnect module; and
a load comprising the one or more contacts, the trip circuit, the auxiliary contact, the energy storage module, the connection module and the disconnect module.

21. A method comprising:
receiving power, with an energy storage module, from an alternating current ("AC") power source when the AC power source is present, wherein the energy storage module is sized to store electrical energy received from the AC power source that is sufficient to open one or more contacts when the AC power source is not present, the one or more contacts disconnecting electrical power to a load, the electrical energy stored in a direct current ("DC") energy storage device;
connecting the energy storage device in series with a trip contact, a trip circuit, and an auxiliary contact, the trip contact closes in response to a trip signal, the trip circuit disconnects the one or more contacts in response to being energized, and the auxiliary contact opens in response to opening of the one or more contacts and disconnects power to the trip circuit; and
periodically disconnecting electrical power from the trip circuit and the auxiliary contact.

* * * * *